United States Patent
Kim et al.

(10) Patent No.: US 9,805,603 B2
(45) Date of Patent: Oct. 31, 2017

(54) SYSTEM AND METHOD FOR DETECTING OBSTACLES

(71) Applicant: Hyundai Mobis Co., Ltd., Seoul (KR)

(72) Inventors: Young shin Kim, Yongin-si (KR); Won gyum Kim, Yongin-si (KR); Soo youn Ryu, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 60 days.

(21) Appl. No.: 14/845,228

(22) Filed: Sep. 3, 2015

(65) Prior Publication Data
US 2016/0071416 A1    Mar. 10, 2016

(30) Foreign Application Priority Data

Sep. 5, 2014    (KR) ........................ 10-2014-0118567

(51) Int. Cl.
*G06F 7/70*    (2006.01)
*G06F 19/00*    (2011.01)
(Continued)

(52) U.S. Cl.
CPC .................. *G08G 1/16* (2013.01); *B60T 7/12* (2013.01); *B60T 7/22* (2013.01); *G01S 7/4802* (2013.01);
(Continued)

(58) Field of Classification Search
None
See application file for complete search history.

(56) References Cited

U.S. PATENT DOCUMENTS 6,061,001 A * 5/2000 Sugimoto ................ B60Q 1/52
                                                         180/169
6,370,475 B1 * 4/2002 Breed .................. B60N 2/2863
                                                         340/436
(Continued)

FOREIGN PATENT DOCUMENTS

CN            1424591       6/2003
CN            1834686       9/2006
(Continued)

OTHER PUBLICATIONS

Korean Notice of Allowance dated May 26, 2016 in Korean Patent Application No. 10-2014-0118567.
(Continued)

*Primary Examiner* — Bhavesh V Amin
(74) *Attorney, Agent, or Firm* — H.C. Park & Associates, PLC (57) ABSTRACT

The present invention provides an obstacle detecting system and method. The obstacle detecting system includes: a transmitting unit which emits a laser signal; a MEMS scanning mirror which scans detecting regions set at an angle of view at which obstacles in front of a vehicle are detected and a cut-in situation when a vehicle in a next lane suddenly cuts in is detected, and divides the detecting regions into a plurality of regions to scan the plurality of regions at different point intervals; a receiving unit which receives the laser signal transmitted from the MEMS scanning mirror to detect information on an object detected in the detecting regions; and a processing unit which detects the obstacles and the cut-in situation through the information detected in the receiving unit to issue an alarm or transmit a braking command.

16 Claims, 4 Drawing Sheets

(51) Int. Cl.

| | | |
|---|---|---|
| G06G 7/00 | (2006.01) | |
| G06G 7/76 | (2006.01) | |
| G08G 1/16 | (2006.01) | |
| G01S 17/93 | (2006.01) | |
| B60T 7/12 | (2006.01) | |
| B60T 7/22 | (2006.01) | |
| G01S 17/42 | (2006.01) | |
| G01S 7/481 | (2006.01) | |
| G01S 7/48 | (2006.01) | |
| G06K 9/00 | (2006.01) | |
| G01S 13/93 | (2006.01) | |

(52) U.S. Cl.
CPC ............ G01S 7/4817 (2013.01); G01S 17/42 (2013.01); G01S 17/936 (2013.01); G08G 1/166 (2013.01); *B60T 2201/022* (2013.01); *G01S 2013/9346* (2013.01); *G06K 9/00805* (2013.01)

(56) References Cited

U.S. PATENT DOCUMENTS

| | | | | |
|---|---|---|---|---|
| 2004/0104837 A1* | 6/2004 | Samukawa | ........... | G01S 17/936 342/70 |
| 2004/0117090 A1* | 6/2004 | Samukawa | ........ | B60K 31/0008 701/45 |
| 2004/0151345 A1* | 8/2004 | Morcom | ................. | G01S 7/487 382/104 |
| 2005/0219506 A1* | 10/2005 | Okuda | ................. | G01S 17/936 356/28 |
| 2006/0006337 A1* | 1/2006 | Kane | .................... | G02B 26/105 250/347 |
| 2006/0017912 A1* | 1/2006 | Egawa | .................... | G01P 13/00 356/4.03 |
| 2006/0215148 A1 | 9/2006 | Yamaguchi et al. | | |
| 2007/0222678 A1* | 9/2007 | Ishio | .................... | G01S 7/4811 342/372 |
| 2014/0062759 A1* | 3/2014 | Morikawa | ............... | G01S 17/42 342/59 |
| 2014/0168630 A1* | 6/2014 | Iida | ........................ | G01S 17/936 356/3 |
| 2015/0301182 A1 | 10/2015 | Geiger et al. | | |
| 2016/0071416 A1* | 3/2016 | Kim | ...................... | G01S 7/4802 701/70 |
| 2016/0170487 A1* | 6/2016 | Saisho | ............... | G01C 21/3635 345/156 |

FOREIGN PATENT DOCUMENTS

| | | |
|---|---|---|
| JP | 2003-028960 | 1/2003 |
| JP | 2012-063230 | 3/2012 |
| KR | 10-2010-0111543 | 10/2010 |
| KR | 10-2014-0098598 | 8/2014 |
| WO | 2014/0095105 | 6/2014 |

OTHER PUBLICATIONS

Chinese Office Action dated May 18, 2017, for Chinese Patent Application No. 201510557030.7.

* cited by examiner

SYSTEM AND METHOD FOR DETECTING OBSTACLES

CROSS-REFERENCE TO RELATED APPLICATION

The present application claims priority from and the benefit of Korean Patent Application No. 10-2014-0118567 filed on Sep. 5, 2014, which is hereby incorporated by reference for all purposes as if fully set forth herein.

BACKGROUND

Field

Exemplary embodiments relate to an obstacle detecting system and method. More particularly, exemplary embodiments relate to an obstacle detecting system and method which efficiently detects obstacles using a MEMS (micro electro mechanical system) LIDAR sensor system.

Discussion of the Background

Recently, an obstacle detecting system is provided in a vehicle in order to prevent a negligent accident caused by colliding with obstacles or a person while driving the vehicle. Such an obstacle detecting system detects presence of obstacles near the vehicle to notify a driver of the presence of obstacles using a warning sound or a displaying light.

In the meantime, an LIDAR sensor system is a system which is attached onto a windshield of the vehicle and observes obstacles outside the vehicle to detect the obstacles and observe an environment.

The LIDAR sensor may be classified into a short range LIDAR, a scan LIDAR, an MEMS LIDAR, and a 3D flash LIDAR.

In the meantime, an MEMS LIDAR sensor system of the related art is required to have a wide angle of view in order to prepare for a cut-in situation, specifically when an obstacle in front of a vehicle is detected or a vehicle in a next lane cuts in. Here, in order to increase an angle of view of the sensor, a resolution needs to be increased. If only the angle of view is increased without increasing the resolution, a spatial resolution is low, so that a rate of detecting the front obstacle is lowered, which cause the performance to be lowered.

In order to increase the angle of view of the sensor, a resolution of the sensor needs to be increased and the resolution is proportional to a high repetition rate of a laser and a detector. However, since a performance of a repetition rate of the laser and the detector is iii limited in the MEMS LIDAR sensor system, a resolution of the sensor which may be obtained with the limited repetition rate is also limited.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an obstacle detecting system and method.

Additional aspects will be set forth in the detailed description which follows, and, in part, will be apparent from the disclosure, or may be learned by practice of the inventive concept.

Therefore, a relationship between a resolution of the MEMS LIDAR and an angle of view is efficiently utilized to effectively detect not only a front obstacle but also a situation when a vehicle in a next lane cuts in.

Objects of the present invention are not limited to the above-mentioned objects, and other objects, which are not mentioned above, can be clearly understood by those skilled in the art from the following descriptions.

An exemplary embodiment of the present invention provides an obstacle detecting system and method. An obstacle detecting system, includes: a transmitting unit which emits a laser signal; a micro electro mechanical system (MEMS) scanning mirror which reflects the laser signal to scan detecting regions, and divides the detecting regions into a plurality of regions to scan the plurality of regions at point intervals different among the plurality of regions; a receiving unit which receives the laser signal transmitted from the MEMS scanning mirror to detect information on an object detected in the detecting regions; and a processing unit which issues an alarm or transmit a braking command through the information detected in the receiving unit, wherein the detecting regions are set an angle of view at which obstacles in front of a vehicle are detected and a cut-in situation when a vehicle in a next lane suddenly cuts in is detected.

The point interval may be adjusted in accordance with a rotating speed of the MEMS scanning mirror.

The detecting region may include an obstacle detecting region with a narrow point interval and a cut-in detecting region with a wide point interval.

The cut-in detecting region may be formed at both sides in a diagonal direction with respect to the obstacle detecting region.

The MEMS scanning mirror may scan the obstacle detecting region and the cut-in detecting region while moving horizontally and vertically with respect to at least one axis.

The point interval at which the obstacle detecting region is scanned may be narrower than the point interval at which the cut-in detecting regions are scanned.

The receiving unit may be formed to detect at least one pixel of information, and may continuously detect information of the object in accordance with the rotating speed of the MEMS scanning mirror.

The receiving unit may include an obstacle detecting region detector which detects information of an object including at least one of a coordinate value, a distance value, and a reflection value of an object which is scanned in the obstacle detecting region; and a cut-in detecting region detector which detects information of an object including at least one of a coordinate value, a distance value, and a reflection value of an object which is scanned in the cut-in detecting regions. For example, at least one of a coordinate value, a distance value, and a reflection value is based on TOF (time of flight) of laser signal.

The processing unit may include an obstacle detecting unit which detects information of an object including at least one of a coordinate value, a distance value, and a reflection value of an object which is detected in the obstacle detecting region; an obstacle classifying unit which classifies the obstacle into a vehicle and a pedestrian through the information detected in the obstacle detecting unit; an cut-in detecting unit which detects information of an object including at least one of a coordinate value, a distance value, and a reflection value of an object which is detected in the cut-in detecting region; and a control unit which issues an alarm or transmits a braking command through the information which is classified by the obstacle classifying unit and the cut-in detecting unit.

The MEMS scanning mirror may transmit a laser signal which hits the object and returns to the receiving unit.

A method for detecting an obstacle, comprising steps of: emitting a laser signal; reflecting by a micro electro mechanical system (MEMS) the laser signal to scan a plurality of regions which is obtained by dividing detecting regions set at an angle of view at which obstacles in front of a vehicle are detected and a cut-in situation when a vehicle in a next lane suddenly cuts in is detected at different point intervals; receiving the laser signal transmitted from the MEMS scanning mirror to detect information on an object detected in the detecting regions; and detecting the obstacles and the cut-in situation through the information detected in the receiving unit to issue an alarm or transmit a braking command.

The point interval may be adjusted in accordance with a rotating speed of the MEMS scanning mirror.

The scanning of the plurality of regions at different point intervals may include: distributing the laser signal by a beam splitter so that the laser signal reaches the MEMS scanning mirror; and dividing the detecting region in which the laser signal is distributed into an obstacle detecting region in which an obstacle in front of the vehicle is detected and a cut-in detecting region in which a cut-in situation when a vehicle in a next lane suddenly cuts in is detected.

The point interval at which the obstacle detecting region is scanned may be narrower than the point interval at which the cut-in detecting regions are scanned.

The detecting of information of an object detected in the detecting region may further comprise transmitting a laser signal to a receiving unit of scanning the obstacle detecting region and the cut-in detecting regions and then transmitting the laser signal which hits the object and returns to the MEMS scanning mirror to the receiving unit.

The receiving unit may be formed to detect at least one pixel of information, and may continuously detect information of the object in accordance with the rotating speed of the MEMS scanning mirror.

The issuing of an alarm or transmitting of a braking command may further comprise detecting information of an object including at least one of a coordinate value, a distance value, and a reflection value of an object which is detected in the obstacle detecting region; classifying the obstacle into a vehicle and a pedestrian through the information detected in the obstacle detecting region; and issuing an alarm or transmitting a braking command through the information classified in the obstacle classified.

The issuing of an alarm or transmitting of a braking command may further comprise include detecting whether there is a cut-in situation through a coordinate value, a distance value, and a reflection value of an object which is detected in the cut-in detecting region; and issuing an alarm or transmitting a braking command through the information detected.

Other detailed matters of the embodiments are included in the detailed description and the drawings.

According to an obstacle detecting system and method of the present invention, there are one or more effects as follows:

First, a design of a MEMS scanning mirror is changed to increase a front visual field, so that not only an obstacle in front of vehicle, but also the cut-in situation is detected, thereby improving a performance.

Second, the cut-in situation is detected through the MEMS scanning mirror, which may relieve an overly cautious driver, a beginner driver, or a female driver.

Third, only the MEMS scanning mirror is redesigned to increase an angle of view of a sensor, so that production cost may be reduced.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Preferred obstacle detecting system and method may be modified by those skilled in the art and the present exemplary embodiment is an obstacle detecting system and method.

Figure 1:
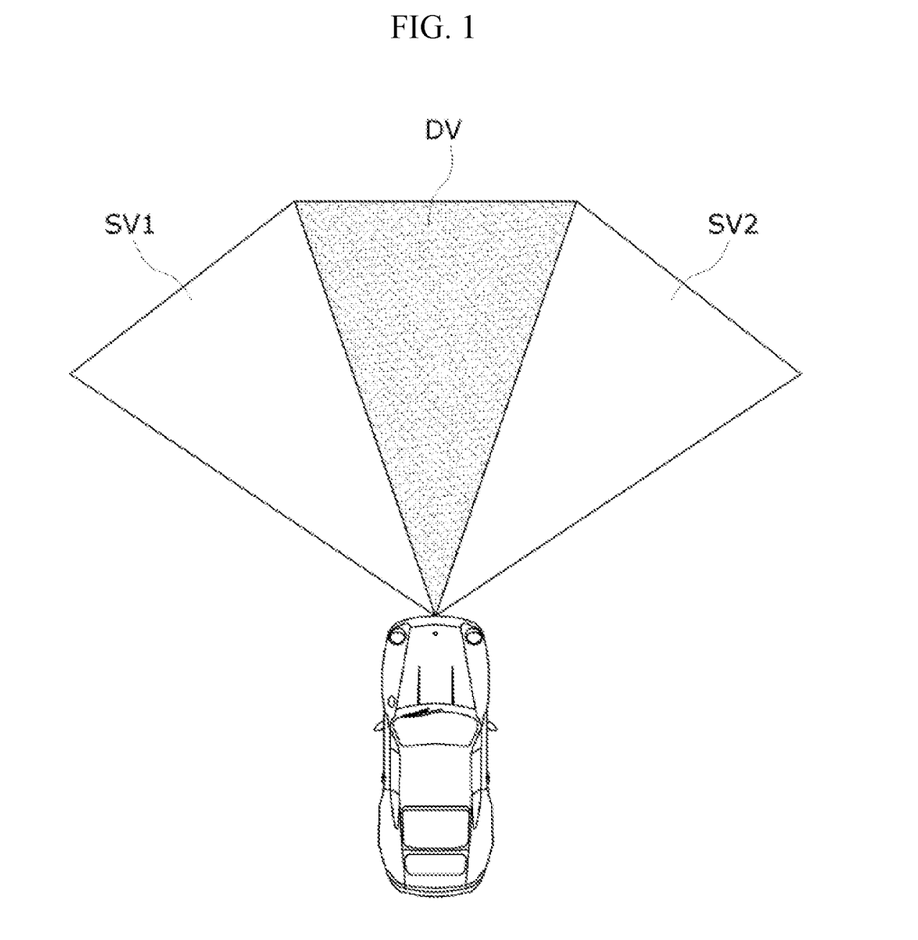
FIG. 1 is a view illustrating a scan region of an obstacle detecting system according to an exemplary embodiment of the present invention.
Figure 2:
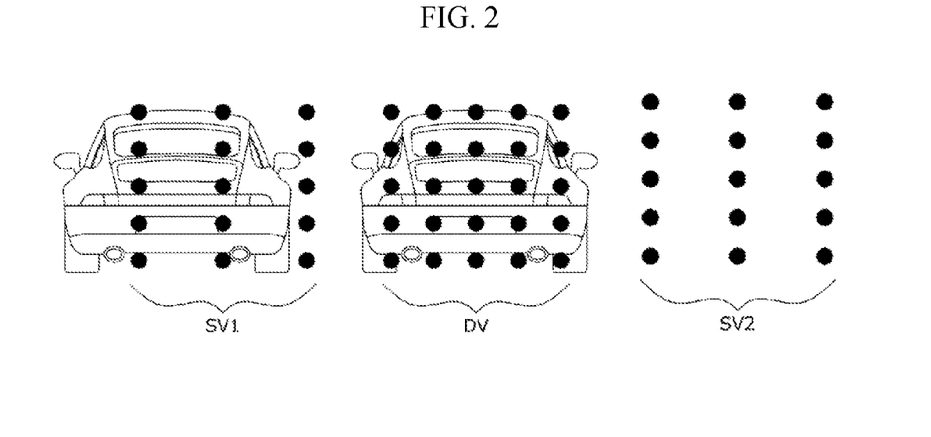
FIG. 2 is a view illustrating an interval of scan points of an obstacle detecting system according to an exemplary embodiment of the present invention.
Figure 3:
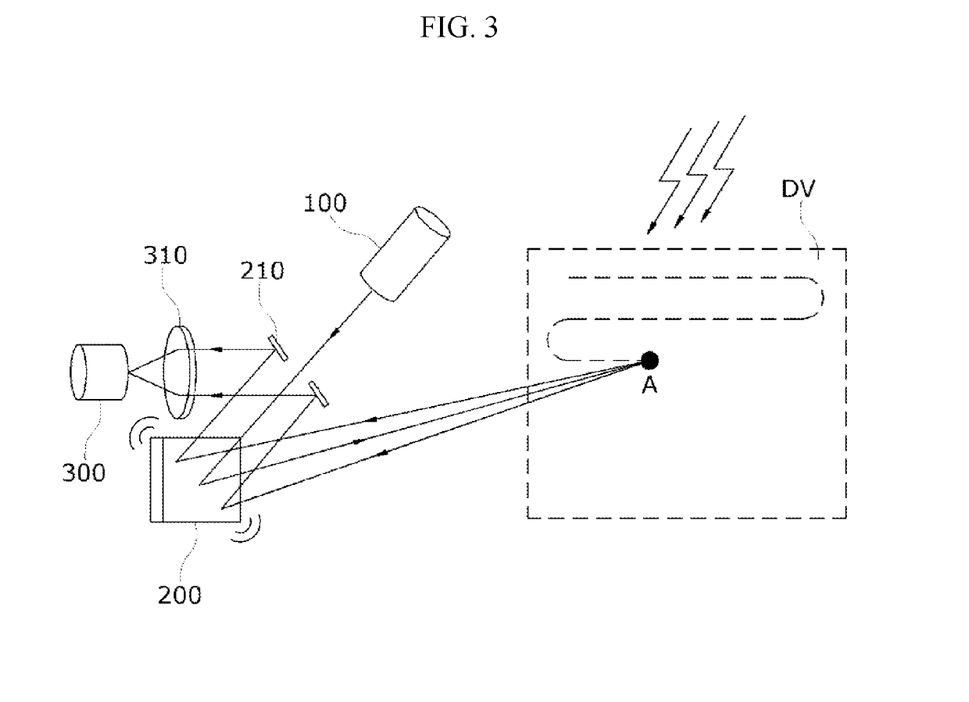
FIG. 3 is a view illustrating an obstacle detecting system according to an exemplary embodiment of the present invention.
Figure 4:
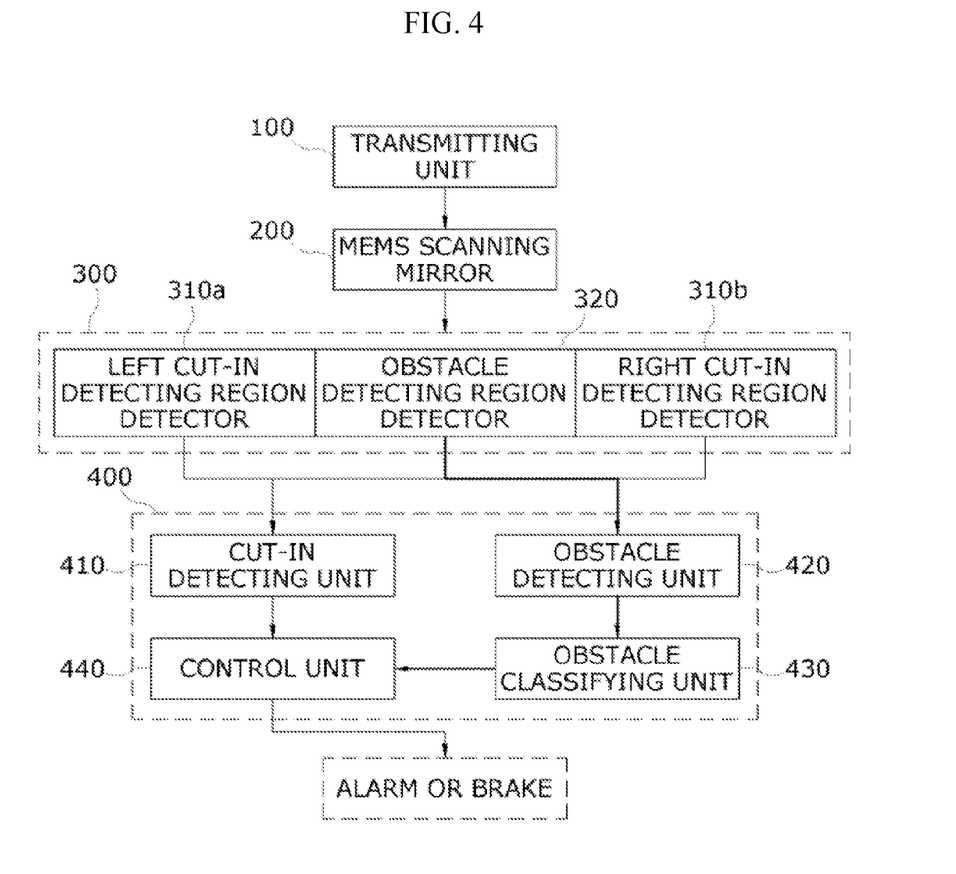
FIG. 4 is a view illustrating a configuration of an obstacle detecting system according to an exemplary embodiment of the present invention.

FIG. 1 is a view illustrating a scan region of an obstacle detecting system according to an exemplary embodiment of the present invention, FIG. 2 is a view illustrating an interval of scan points of an obstacle detecting system according to an exemplary embodiment of the present invention, FIG. 3 is a view illustrating an obstacle detecting system according to an exemplary embodiment of the present invention, and FIG. 4 is a view illustrating a configuration of an obstacle detecting system according to an exemplary embodiment of the present invention.

Referring to FIGS. 1 to 4, an obstacle detecting system according to an exemplary embodiment of the present invention includes a transmitting unit 100 which emits a laser signal, a beam splitter 210, a MEMS scanning mirror 200 which reflects the laser signal and scans detecting regions SV1, SV2, and DV (FIG. 1) set at an angle of view at which obstacles in front of a vehicle are detected and a cut-in situation when a vehicle in a next lane suddenly cuts in is detected, and divides the detecting regions SV1, SV2 and DV into a plurality of regions to scan the plurality of regions at different point intervals (FIG. 2), a receiving unit 300 which receives the laser signal transmitted from the MEMS scanning mirror 200 to detect information on an object detected in the detecting regions SV1, SV2, and DV, and a processing unit 400 which detects the obstacles and the cut-in situation through the information detected in the receiving unit 300 to operate an alarm or transmit a braking command.

The transmitting unit 100 may emit the laser signal.

The beam splitter 210 transmits the laser signal to the MEMS scanning mirror 200. The beam splitter 210 transmits the laser signal which hits the object A (FIG. 3) and returns from the object A and then is reflected by the MEMS scanning mirror 200 to the receiving unit 300.

The MEMS scanning mirror 200 may transmit the laser signal which hits the object and returns from the object to the receiving unit 300. In this case, the laser signal which hits the object and returns from the object may be reflected by the beam splitter 210 to be transmitted to the transmitting unit 300.

The MEMS scanning mirror 200 may reflect the laser signal to scan the detecting regions SV1, SV2, and DV set at the angle of view at which obstacles in front of a vehicle are detected and a cut-in situation when a vehicle in a next lane suddenly cuts in.

The MEMS scanning mirror 200 may divide the detecting regions SV1, SV2, and DV into a plurality of regions to scan the plurality of regions at different point intervals (FIG. 2).

The MEMS scanning mirror 200 may rotate with respect to two axes (an X axis and a Y axis) and adjusts a direction of light in accordance with an angle of a mirror plate located at a center. The obstacle detecting system according to the exemplary embodiment of the present invention may utilize the MEMS scanning mirror 200 to obtain an image having a high resolution of n×n (grid resolution) only using a single laser and a signal detector having a resolution for one pixel. Here, the MEMS scanning mirror 200 may rotate with respect to one axis or two axes.

Referring to FIG. 2, the detecting regions SV1, SV2, and DV may include an object detecting region DV in which the obstacles are detected at a narrow point interval and cut-in detecting regions SV1 and SV2 in which the cut-in situation is detected at a wide point interval.

That is, the obstacle detecting region DV may be a region having a high resolution in order to detect an obstacle in front of a vehicle. The cut-in detecting regions SV1 and SV2 may be regions having a low resolution to determine presence of a cut-in object. Further, the cut-in detecting regions SV1 and SV2 may be formed at both sides in a diagonal direction with respect to the obstacle detecting region DV.

The cut-in detecting regions SV1 and SV2 may be divided into a left cut-in detecting region SV1 in a diagonal direction at a left side of the obstacle detecting region DV and a right cut-in detecting region SV2 in a diagonal direction at a right side of the obstacle detecting region DV. However, the MEMS scanning mirror 200 may scan the regions while moving horizontally and vertically, so that the directions of the detecting region are not specifically limited.

According to the exemplary embodiment, the MEMS scanning mirror 200 may scan the left cut-in detecting region SV1 and the right cut-in detecting region SV2 at the same point interval, but the present invention is not limited thereto.

The obstacle detecting region DV is required to precisely detect the object so that an alarm for incident in front of the vehicle is issued and an autonomous emergency braking AEB operates. In contrast, in the cut-in detecting regions SV1 and SV2, it is satisfied that only cut-in situation is detected, so that it is efficient to detect wide regions even at a low resolution.

Here, the resolution of the obstacle detecting system may be obtained by a laser repetition rate per second N_laser, a detector repetition rate per second N_detector, and a system required repetition rate N_system as represented in the following Equation. The maximum resolution Res_max is proportional to a minimum value between the laser repetition rate per second N_laser and the detector repetition rate per second N_detector and is inversely proportional to the system required repetition rate N_system. The above description may be represented by Equation as follows.

$$Res\_max = min(N\_laser, N\_detector)/N\_system$$

The MEMS scanning mirror 200 may move while scanning the obstacle detecting region DV and the cut-in detecting regions SV1 and SV2 left and right and up and down. In this case, a point interval at which the MEMS scanning mirror 200 scans the obstacle detecting region DV is set to be narrower than a point interval at which the MEMS scanning mirror 200 scans the cut-in detecting regions SV1 and SV2, therefore, the obstacle in the obstacle detecting region DV may be detected correctly.

The receiving unit 300 may be formed to detect at least one pixel of information, and may continuously detect information of an object in accordance with a rotation speed at which the MEMS scanning mirror 200 rotates.

The receiving unit 300 receives the laser signal transmitted from the MEMS scanning mirror 200 to detect information of the object including at least one of a coordinate value, a distance value, and a reflection value of an object which is detected in the obstacle detecting region DV and the cut-in detecting regions SV1 and SV2.

The receiving unit 300 may include an obstacle detecting region detector 320 and cut-in detecting region detectors 310a and 310b (FIG. 4). The obstacle detecting region detector 320 detects the information of an object including at least one of a coordinate value, a distance value, and a reflection value of an object which is scanned in the obstacle detecting region DV. The cut-in detecting region detectors 310a and 310b detect information of the object including at least one of a coordinate value, a distance value, and a reflection value of an object which is scanned in the cut-in detecting regions SV1 and SV2 which may be located at both sides of the obstacle detecting region DV.

Here, the cut-in detecting region detectors 310a and 310b may be divided into a left cut-in detecting region detector 310a which detects information of the object including at least one of a coordinate value, a distance value, and a reflection value of an object which is scanned in the left cut-in detecting region SV1 and a right cut-in detecting region detector 310b which detects information of the object including at least one of a coordinate value, a distance value, and a reflection value of an object which is scanned in the right cut-in detecting region SV2.

The processing unit 400 may detect the obstacle and the sudden cut-in situation through the information of the object detected in the receiving unit 300 to issue an alarm or transmit a braking command.

The processing unit 400 may include an obstacle detecting unit 420 which detects whether there is an obstacle through the information of the object including at least one of the coordinate value, the distance value, and the reflection value of the object detected in the obstacle detecting region DV, an obstacle classifying unit 430 which classifies the obstacle into a vehicle and a pedestrian through the information detected in the obstacle detecting unit 420, a cut-in detecting unit 410 which detects whether there is a cut-in situation through the information of the object including at least one of the coordinate value, the distance value, and the reflection value of the object detected in the cut-in detecting regions SV1 and SV2, and a control unit 440 which issues an alarm or transmits a braking command through the information which is classified by the obstacle classifying unit 430 and the cut-in detecting unit 410.

The cut-in detecting unit 410 may determine whether the cut-in situation occurs through the information of the object including at least one of the coordinate value, the distance value, and the reflection value of the object detected in the cut-in detecting regions SV1 and SV2 and transmit at least one of the position and the speed of the cutting in vehicle or pedestrian to the control unit 440.

The obstacle detecting unit 420 may detect whether there is an obstacle through the information of the object including at least one of the coordinate value, the distance value, and the reflection value of the object detected in the obstacle detecting region DV and transmit at least one of a position and speed information of the obstacle to the obstacle classifying unit 430.

The obstacle classifying unit 430 may classify the obstacle into a vehicle and a pedestrian through the information detected by the obstacle detecting unit 420 and transmit at least one of a kind of the object, a position of the object, and speed information to the control unit 440.

The control unit 440 may calculate an alarm or a braking control signal through the information transmitted from the obstacle classifying unit 430 and the cut-in detecting unit 410 to issue the alarm or transmit the signal to a braking cluster.

Hereinafter, a control method of an obstacle detecting system according to an exemplary embodiment of the present invention will be described with reference to FIG. 5.

Figure 5:
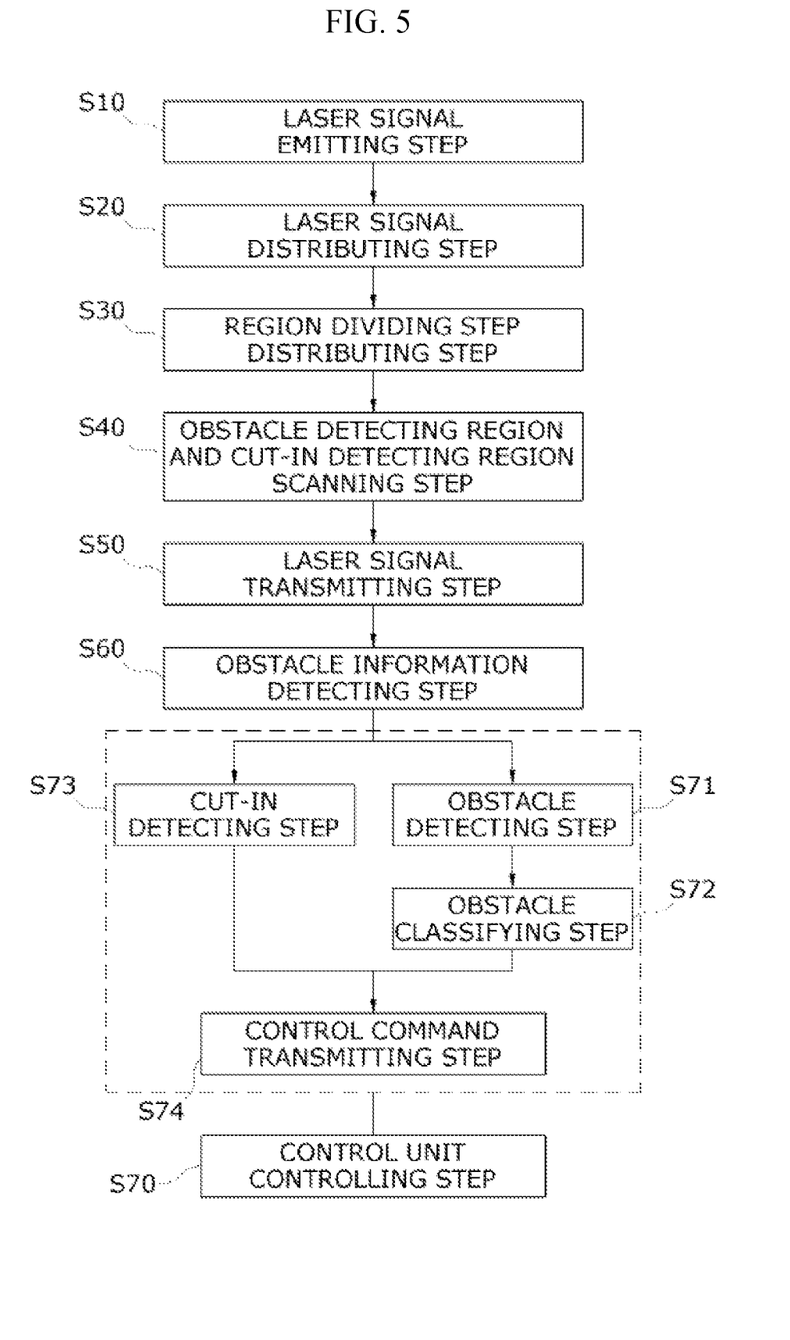
FIG. 5 is a flowchart illustrating a flow of an obstacle detecting system according to an exemplary embodiment of the present invention.

FIG. 5 is a flowchart illustrating a flow of an obstacle detecting system according to an exemplary embodiment of the present invention.

First, the transmitting unit 100 emits a laser signal in step S10.

The beam splitter 210 distributes the laser signal in step S20. The beam splitter 210 distributes the laser signal which is emitted in a laser signal emitting step S10 and the distributed laser signal reaches the MEMS scanning mirror 200.

The MEMS scanning mirror 200 divides detecting regions DV, SV1, and SV2 in which the laser signal is distributed into a plurality of regions in step S30. The MEMS scanning mirror 200 divides the detecting regions DV, SV1, and SV2 in which the laser signal is distributed into an obstacle detecting region DV in which an obstacle in front of a vehicle is detected and cut-in detecting regions SV1 and SV2 in which a cut-in situation when a vehicle in a next lane suddenly cuts in is detected.

That is, the obstacle detecting region DV may be a region having a high resolution in order to detect an obstacle in front of a vehicle. The cut-in detecting regions SV1 and SV2 may be regions having a low resolution to determine only presence of a cut-in object. Further, the cut-in detecting regions SV1 and SV2 may be formed at both ends in a diagonal direction with respect to the obstacle detecting region DV.

The cut-in detecting regions SV1 and SV2 may be divided into a left cut-in detecting region SV1 in a diagonal direction at a left side of the obstacle detecting region DV and a right cut-in detecting region SV2 in a diagonal direction at a right side of the obstacle detecting region DV. However, the MEMS scanning mirror 200 may scan the regions while moving up and down and left and right, so that the directions of the detecting region are not specifically limited.

According to the exemplary embodiment, the MEMS scanning mirror 200 may scan the left cut-in detecting region SV1 and the right cut-in detecting region SV2 at the same point interval, but the present invention is not limited thereto.

The MEMS scanning mirror 200 scans the obstacle detecting region DV and the cut-in detecting regions SV1 and SV2 in step S40. The MEMS scanning mirror 200 reflects the laser signal which reaches the MEMS scanning mirror 200 in a laser signal distributing step S20 to scan the obstacle detecting region DV and the cut-in detecting regions SV1 and SV2 at different point intervals.

The point interval described above may be adjusted in accordance with a rotating speed of the MEMS scanning mirror 200.

In an obstacle detecting region DV and cut-in detecting regions SV1 and SV2 scanning step S40, the point interval at which the obstacle detecting region DV is scanned is narrower than a point interval at which the cut-in detecting regions SV1 and SV2 are scanned so that a resolution of the obstacle detecting region DV may be higher than a resolution of the cut-in detecting regions SV1 and SV2.

The obstacle detecting region DV is required to precisely detect the object so that an alarm for incident in front of the vehicle is issued and an autonomous emergency braking AEB operates. In contrast, in the cut-in detecting regions SV1 and SV2, it is satisfied that only cut-in situation is detected, so that it is efficient that wide regions are detected even at a low resolution.

The beam splitter 210 reflects the laser signal which returns from the MEMS scanning mirror 200 and transmits the signal to the receiving unit in step S50. The beam splitter 210 scans the obstacle detecting region DV and the cut-in detecting regions SV1 and SV2 in an obstacle detecting region DV and cut-in detecting regions SV1 and SV2 scanning step S40 and then transmits the laser signal which hits the object and returns to the MEMS scanning mirror 200 to the receiving unit 300.

The receiving unit 300 detects information of the object through the signal which is transmitted to the receiving unit 300 in the step S50 of transmitting a laser signal to a receiving unit. The receiving unit 300 receives the laser signal transmitted in the step S50 of transmitting a laser signal to a receiving unit to detect information of the object including at least one of a coordinate value, a distance value, and a reflection value of an object which is detected in the obstacle detecting region DV and the cut-in detecting regions SV1 and SV2.

In this case, the obstacle detecting region detector 320 detects the information of an object including at least one of a coordinate value, a distance value, and a reflection value of an object which is scanned in the obstacle detecting region DV, a left cut-in detecting region detector 310a detects information of the object including at least one of a coordinate value, a distance value, and a reflection value of an object which is scanned in the left cut-in detecting region SV1, and a right cut-in detecting region detector 310b detects information of the object including at least one of a coordinate value, a distance value, and a reflection value of an object which is scanned in the right cut-in detecting region SV2.

The processing unit 400 controls the control unit through the information detected in an object information detecting step S60 in step S70. The processing unit 400 detects the obstacle and the cut-in situation through the information of the object including at least one of a coordinate value, a distance value, and a reflection value of an object detected in the object information detecting step S60 and the control unit 440 issues an alarm or transmits a braking command.

Here, a control unit control step S70 is divided into four steps.

The obstacle detecting unit 420 detects whether there is an obstacle through the information of the object including at least one of the coordinate value, the distance value, and the reflection value of the object detected in the obstacle detecting region DV and transmits at least one of a position and a speed of the obstacle to the control unit 440 in step S71.

The obstacle classifying unit 430 classifies the obstacle into a vehicle and a pedestrian through the information detected in the obstacle detecting step S71 and transmits at least one of a kind of the object, a position of the object, and speed information to the control unit 440.

In the meantime, the cut-in detecting unit 410 determines whether the cut-in situation occurs through the information of the object including at least one of the coordinate value, the distance value, and the reflection value of the object detected in the cut-in detecting regions SV1 and SV2 and transmits at least one of the position and the speed of the cutting in vehicle to the control unit 440 in step S73.

The control unit 440 issues an alarm or transmits a braking command through the information classified in the obstacle classifying step S72 and the cut-in detecting step S73 in step S74.

According to an exemplary embodiment of the obstacle detecting system and method of the present invention configured as described above, specifically, a relationship between a resolution of the MEMS LIDAR and an angle of view is efficiently utilized to effectively detect not only an obstacle in front of a vehicle but also a cut-in situation when a vehicle in a next lane cuts in.

In the obstacle detecting system and method according to the exemplary embodiment, the configuration and method of embodiments as described above may not be applied with limitation, but the embodiments may be configured by selectively combining all or a part of each embodiment such that various modifications may be made.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An obstacle detecting system, comprising:
   a transmitting unit configured to emit a laser signal;
   a micro electro mechanical system (MEMS) scanning mirror configured to reflect the laser signal to scan detecting regions and configured to divide the detecting regions into an obstacle detecting region and cut-in detecting regions at point intervals different among the detecting regions;

a receiving unit configured to receive the laser signal transmitted from the MEMS scanning mirror and configured to detect information of an object detected in the obstacle detecting region and the cut-in detecting regions; and a processing unit which issues an alarm or transmits a braking command based on the information detected from the receiving unit, wherein the obstacle detecting region is set at an angle of view at which an obstacle in front of a vehicle is detected and the cut-in detecting regions are set at angles of view at which a cut-in situation from a vehicle in a next lane is detected, wherein the information of the object detected comprises at least one value selected from the group consisting of a coordinate value, a distance value, and a reflection value, and wherein the processing unit comprises:

an obstacle detecting unit configured to detect whether the object is the obstacle based on the information of the object detected in the obstacle detecting region an obstacle classifying unit configured to classify the obstacle into a vehicle and a pedestrian based on the information of the object detected in the obstacle detecting region;

a cut-in detecting unit configured to detect whether there is the cut-in situation based on the information of the object detected in the obstacle detecting region; and a control unit configured to issue the alarm or transmit the braking command based on the classification of the obstacle from the obstacle classifying unit and detection of the cut-in situation from the cut-in detecting unit.

2. The system of claim 1, wherein the point interval is adjusted in accordance with a rotating speed of the MEMS scanning mirror.

3. The system of claim 1, wherein the detecting regions comprises an the obstacle detecting region with a narrow point interval and the cut-in detecting regions with a wide point interval.

4. The system of claim 3, wherein the cut-in detecting regions are formed at both sides in a diagonal direction with respect to the obstacle detecting region.

5. The system of claim 3, wherein the MEMS scanning mirror is configured to scan the obstacle detecting region and the cut-in detecting regions while moving horizontally and vertically with respect to at least one axis.

6. The system of claim 3, wherein the point interval at which the obstacle detecting region is scanned is narrower than the point interval at which the cut-in detecting regions are scanned.

7. The system of claim 1, wherein the receiving unit is formed to detect at least one pixel of information, and to continuously detect the information of the object in accordance with the rotating speed of the MEMS scanning mirror.

8. The system of claim 3, wherein the receiving unit comprises:

an obstacle detecting region detector configured to detect the information of the object scanned in the obstacle detecting region; and a cut-in detecting region detector configured to detect the information of an the object scanned in the cut-in detecting regions.

9. The system of claim 1, wherein the MEMS scanning mirror is configured to transmit the laser signal to hit the object and return to the receiving unit.

10. A method for detecting an obstacle, comprising:
emitting a laser signal;

reflecting, by a micro electro mechanical system (MEMS) scanning mirror, the laser signal to scan a plurality of regions which is obtained by dividing detecting regions into an obstacle detecting region set at an angle of view at which the obstacle in front of a vehicle is detected and cut-in detecting regions set at angles of view at which a cut-in situation from a vehicle in a next lane is detected;

receiving the laser signal transmitted from the MEMS scanning mirror to detect information of an object detected in the obstacle detecting region and the cut-in detecting regions;

detecting the obstacle based on the information of the object detected in the obstacle detecting region; and issuing an alarm or transmitting the a braking command based on detecting the obstacle from the information of the object detected in the obstacle detecting region, wherein the obstacle detecting region and the cut-in detecting regions are at different point intervals, wherein the information of the object detected in detecting regions comprises at least one value selected from the group consisting of a coordinate value, a distance value, and a reflection value, wherein issuing the alarm or transmitting of the braking command further comprises:

classifying the obstacle into a vehicle and a pedestrian based on the information detected in the obstacle detecting region, and issuing the alarm or transmitting the braking command based on the classification of the obstacle.

11. The method of claim 10, wherein the point interval is adjusted in accordance with a rotating speed of the MEMS scanning mirror.

12. The method of claim 10, wherein the scanning of the plurality of regions at different point intervals comprises:
distributing the laser signal by a beam splitter so that the laser signal reaches the MEMS scanning mirror.

13. The method of claim 10, wherein the point interval at which the obstacle detecting region is scanned is narrower than the point interval at which the cut-in detecting regions are scanned.

14. The method of claim 10, wherein detecting of the information of the object detected in the detecting regions further comprises:

transmitting the laser signal to a receiving unit of scanning the obstacle detecting region and the cut-in detecting regions and then transmitting the laser signal which hits the object and returns to the MEMS scanning mirror to the receiving unit.

15. The method of claim 14, wherein the receiving unit is formed to detect at least one pixel of information, and to continuously detect information of the object in accordance with the rotating speed of the MEMS scanning mirror.

16. The method of claim 10, wherein issuing of the alarm or transmitting of the braking command further comprises:
detecting whether there is the cut-in situation based on the information of the object which is detected in the cut-in detecting regions; and issuing the alarm or transmitting the braking command based on whether the cut-in situation is detected.

* * * * *